United States Patent
Ishanov et al.

(10) Patent No.: US 11,327,848 B2
(45) Date of Patent: May 10, 2022

(54) SYSTEM AND METHOD FOR DATA REMEDIATION WITHOUT DATA LOSS

(71) Applicant: Acronis International GmbH, Schaffhausen (CH)

(72) Inventors: Oleg Ishanov, Singapore (SG); Vladimir Strogov, Moscow (RU); Igor Kornachev, Dolgoprudny (RU); Andrey Kulaga, Moscow (RU); Nikolay Grebennikov, Moscow (RU); Serguei Beloussov, Costa del Sol (SG); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 35 days.

(21) Appl. No.: 16/718,399

(22) Filed: Dec. 18, 2019

(65) Prior Publication Data

US 2020/0192769 A1 Jun. 18, 2020

Related U.S. Application Data (60) Provisional application No. 62/781,318, filed on Dec. 18, 2018.

(51) Int. Cl.
*G06F 11/14* (2006.01)
*G06F 21/55* (2013.01)

(52) U.S. Cl.
CPC ...... *G06F 11/1469* (2013.01); *G06F 11/1451* (2013.01); *G06F 21/554* (2013.01); *G06F 2201/80* (2013.01); *G06F 2201/82* (2013.01); *G06F 2221/033* (2013.01)

(58) Field of Classification Search
CPC .. G06F 11/14; G06F 11/1469; G06F 11/1451; G06F 11/1448
See application file for complete search history.

(56) References Cited

U.S. PATENT DOCUMENTS

| | | | | |
|---|---|---|---|---|
| 5,745,669 A | * | 4/1998 | Hugard | G06F 11/1417 714/3 |
| 6,477,544 B1 | * | 11/2002 | Bolosky | G06F 16/174 |
| 8,244,997 B2 | * | 8/2012 | Teranishi | G06F 21/564 711/162 |
| 2004/0260894 A1 | * | 12/2004 | Keohane | G06F 11/1466 711/162 |

(Continued)

*Primary Examiner* — Kamini B Patel
(74) *Attorney, Agent, or Firm* — ArentFox Schiff LLP; Michael Fainberg (57) ABSTRACT

Disclosed herein are systems and methods for data remediation without data loss. In one exemplary aspect, the method comprises performing, at a first time, a first backup of a plurality of files on a file system of a computer system; tracking changes to any of the plurality of files on the file system after the first time; performing, at a second time, a second backup of the plurality of files on the file system; detecting, based on a scan of the second backup, an infection of the computer system caused by a malicious application; identifying, by the processor, a most recent backup of the file system that does not comprise the infection; in response to determining that the first backup is the most recent backup: restoring the first backup to the file system, and restoring a subset of files on the file system for which authorized changes.

18 Claims, 6 Drawing Sheets

(56) References Cited

U.S. PATENT DOCUMENTS

| | | | |
|---|---|---|---|
| 2006/0112309 A1* | 5/2006 | Khurshudov | G06F 11/1456 714/13 |
| 2006/0253734 A1* | 11/2006 | Oka | G06F 11/1458 714/6.12 |
| 2009/0113151 A1* | 4/2009 | Teranishi | G06F 21/564 711/162 |
| 2009/0198704 A1* | 8/2009 | Landberg | G06F 16/13 |
| 2012/0158675 A1* | 6/2012 | Gupta | G06F 16/1748 707/693 |

* cited by examiner

SYSTEM AND METHOD FOR DATA REMEDIATION WITHOUT DATA LOSS

CROSS-REFERENCE TO RELATED APPLICATIONS

This application claims benefit of priority to U.S. Provisional Patent Application No. 62/781,318 filed on Dec. 18, 2018, which is herein incorporated by reference in its entirety.

FIELD OF TECHNOLOGY

The present disclosure relates generally to the field of data remediation, and more specifically, to systems and method for data remediation without data loss.

BACKGROUND

Typically, anti-virus software solutions detect infections of computer systems and computer networks, and remove all infected data. However, there is no guarantee that all the artifacts of infection are entirely removed from the computer system because often the anti-virus software solutions are not aware of all of the various components and attack vectors used by the virus.

Remediation generally involves the removal of detected threats, i.e., the removal of the source of data corruption. The artifacts that the anti-virus software solution may fail to remove can be in user or system data, in the system registry, in the elements of the file system or the like. The software solution does not know all the paths of the destructive impact of the detected malware.

Thus, there should be a method to find the data that is guaranteed not to be damaged by a virus/malware attack. This data can be stored in a backup copy of an earlier attack. Upon restore, it is also important for us not to lose all the data, files and documents of users that were produced during the time elapsed since the backup was created.

SUMMARY

Aspects of the disclosure describe systems and methods for data remediation without data loss. In one exemplary aspect, the method comprises performing, at a first time, a first backup of a plurality of files on a file system of a computer system; tracking changes to any of the plurality of files on the file system after the first time; performing, at a second time, a second backup of the plurality of files on the file system; detecting, based on a scan of the second backup, an infection of the computer system caused by a malicious application; identifying, by the processor, a most recent backup of the file system that does not comprise the infection; in response to determining that the first backup is the most recent backup: (1) restoring the first backup to the file system, and (2) restoring a subset of files on the file system for which authorized changes were detected between the first time and the second time.

In one aspect, the authorized changes comprises at least one of (1) file modification, (2) file removal, (3) file creation. In particular, the authorized changes are changes not caused by the malicious application and are verified by a user of the computer system.

In one aspect, a third backup is performed at a third time between the first time and the second time, the infection was caused between the first time and the third time, and the infection was detected after the second time. The method further comprises performing a scan of the third backup; and in response to determining that the infection exists in the third backup, restoring the first backup and restoring the subset of files.

In one aspect, the infection was caused between the third time and the second time, and the infection was detected by the processor after the second time. Accordingly, the method comprises performing a scan of the third backup, and in response to determining that the infection does exist in the third backup, restoring the third backup and restoring another subset of files on the file system for which authorized changes were detected between the third time and the second time.

In one aspect, the method comprises tracking the changes to any of the plurality of files by: determining whether new user files were created or existing user files were modified after the first backup of the plurality of files on the file system, and storing path information related to the new user files or modified user files to secure storage.

In one aspect, restoring the subset of files comprises retrieving the path information of the new user files and modified user files after restoring the first backup, and restoring the subset of files based on the retrieved path information.

In one aspect, the method comprises storing the new user files and modified user files to the secure storage along with their path information, performing a scan for maliciousness on the new user files and the modified user files, and restoring the new user files and the modified user files from the secure storage to the file system of the computer system.

In one aspect, the method comprises storing the path information, the new user files and the modified user files in a sync and share storage volume; maintaining reparse points and metadata for the new and modified user files, wherein the metadata identifies a location of the new and modified user files in the sync and share storage volume; and recalling data of the new and modified user files immediately.

In one aspect, the method comprises identifying a dedicated portion of an image backup archive used for regular backup operations, and storing the path information, the new user files and the modified user files in the dedicated portion of the image backup archive.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for remediation of data without data loss. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1A:
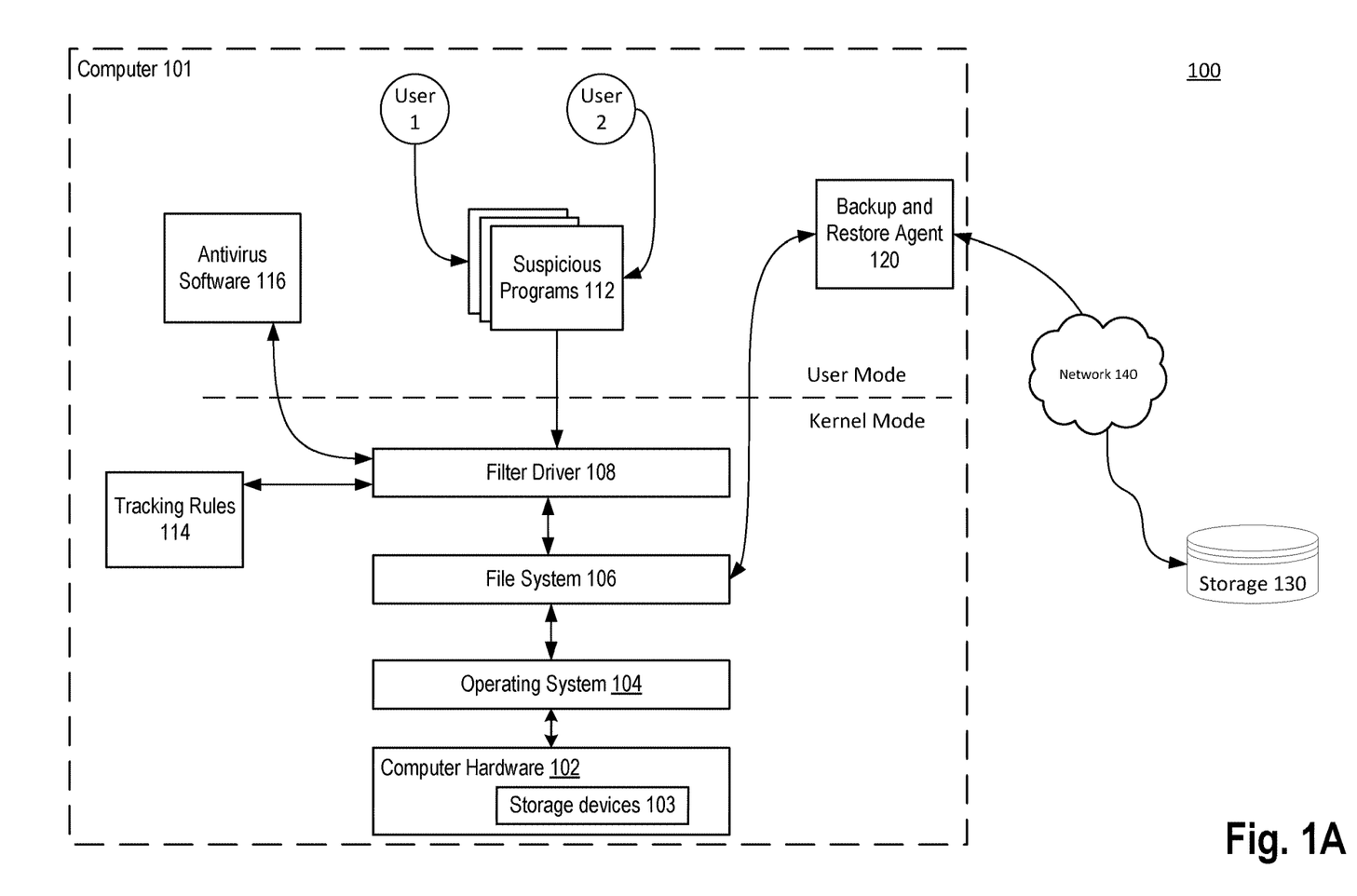
FIG. 1A is a block diagram illustrating a system for remediation of data without loss, in accordance with exemplary aspects of the present disclosure.

FIG. 1A is a block diagram illustrating a system 100 for remediation of data without loss, in accordance with exemplary aspects of the present disclosure.

In an exemplary aspect, the system 100 comprises computer hardware 102, an operating system 104, a file system 106, a filter driver 108, a backup and restore agent 120 and storage 130. The computer hardware 102 is used to execute the operating system 104. According to exemplary aspects, the computer hardware 102 may include storage devices 103 for storing user data including files, applications, and other system settings. The operating system 104 acts as an interface between the file system 106 and the storage devices 103. In some aspects, the operating system 104 may be WINDOWS, MACOS, UNIX or the like, though aspects of the disclosure are not limited thereto. Multiple users, e.g., User 1 and User 2, may have access to the computer hardware 102 via the operating system 104.

In exemplary aspects, the filter driver 108 intercepts any modifications to files by suspicious applications 112. The filter driver 108 may be a software module that executes in kernel mode along with file system 106 and operating system 104. In exemplary aspects, the filter driver 108 is configured to track any changes of defined files, location and other data according to tracking rules 114. In some aspects, these tracked files may be those files being designated as "important" files or the like. According to one aspect, the tracking rules for selecting which files to protect include considering: files that have been modified (both file type and location), programs that have modified these files (for example, MS Word, Excel), users who have modified these documents (or at least one of the users in the case of multi-user access), file contents, or other classification rules.

Furthermore, the backup and restore agent 120 performs backups of specified files in the file system 106 on a periodic basis. The backups may be stored locally on storage devices 103, on remote storage 130, or a combination of both.

Figure 1B:
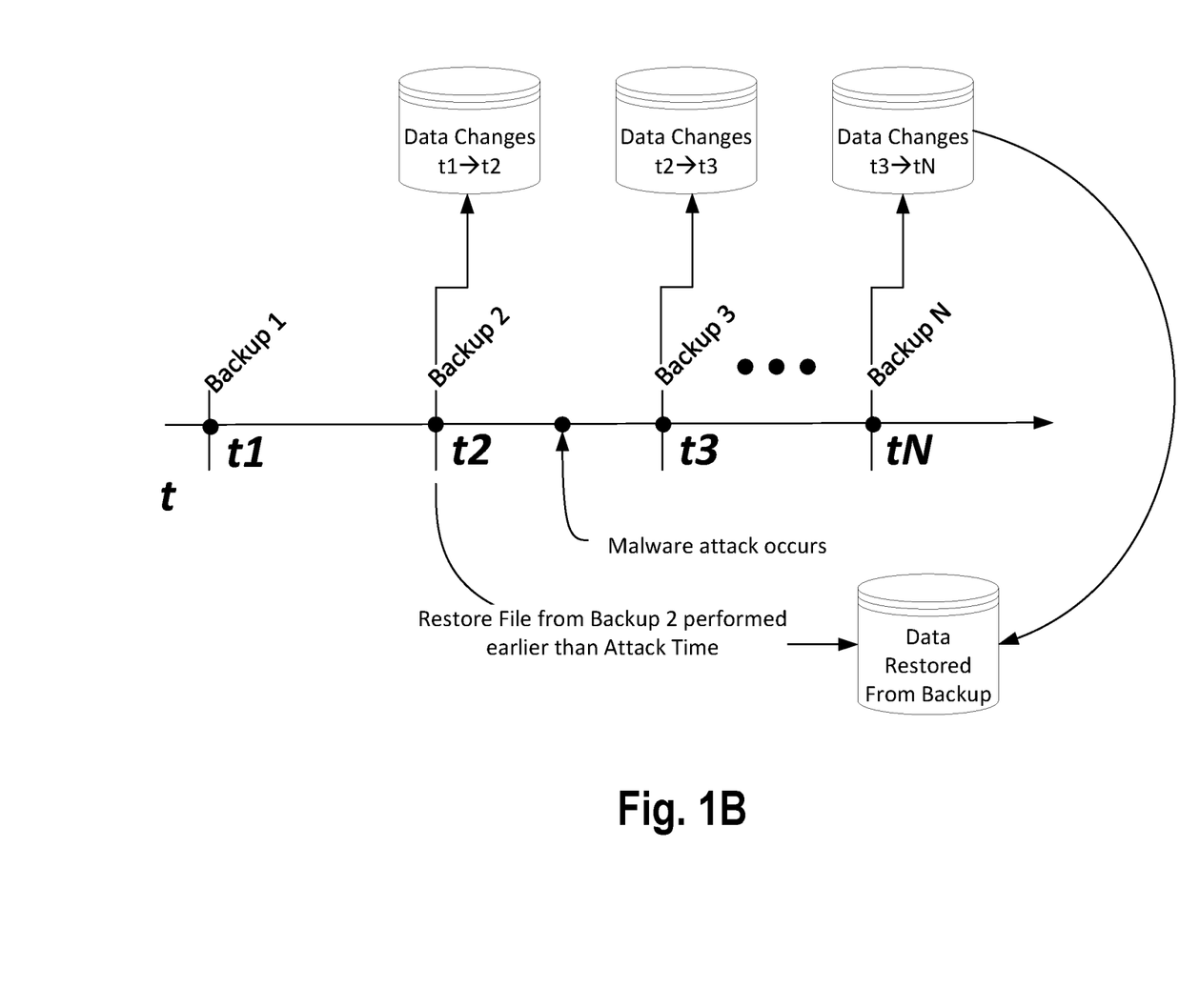
FIG. 1B is a diagram illustrating a timeline for remediation of data without loss, in accordance with exemplary aspects of the present disclosure.

The periodic backups are illustrated in FIG. 1B along a timeline t. An initial backup 1 is performed for the data on the storage device 103 at time t1. Some data may change following this backup by the user, by programs or the like. Subsequently, after a predetermined amount of time (e.g., 2 hours) or the detection of some event (e.g., a manual request for backup), Backup 2 is performed at t2. Following this pattern, backup 3 and backup N occur at t3 and tN, respectively. A malware attack may occur between t2 and t3. At the time of attack, backup 2 has been stored on storage device 103, but the files on computer 101 may be further modified by the user.

In some aspects, anti-virus software 116 may automatically scan for malware at computer 101 before a respective backup is stored on storage device 103. Accordingly, each backup is scanned before uploading. In this case, anti-virus software 116 may detect the malware attack between the time of attack and t3 (when backup 3 is uploaded). In some aspects, anti-virus software 116 may upload a backup to storage device 103 and concurrently scan for malware. In this case, the malware attack may be detected between t3 and tN. In either scenario, anti-virus software 116 may determine that the malware attack occurred between t2 and t3 because backup 2 did not have signs of malware activity and backup 3 does.

The malware attack may affect a subset of the plurality of files (both directly and indirectly) on computer 101. For example, the malware attack may target a first file, but the first file may be associated with a particular application that interacts with the first file. Thus, if the first file is corrupted, the output of the particular application subsequent to the interaction may be a corrupted file as well. Because of this, backup and restore agent 120 cannot simply omit the first file from the backup because the particular application may become inoperable or unable to produce an output if the first file is a critically important file. In general, the removal of unsafe files is an error prone process because a removal may cause a chain of corrupted files and application/process failures.

In response to detecting that a malware attack has occurred between t2 and t3, backup and restore agent 120 may restore backup 2 on computer 101. Backup and restore agent 120 may then retrieve authentic user initiated changes to safe files between t2 and t3 and implement those changes in the restored backup 2. As a result, a malware-free backup is restored on computer 101 and all user changes between t2 and t3 are retained. In this manner, remediation of data without loss is performed by system 100.

In some aspects, backups may not be scanned periodically or during backups (possibly to save processing power). For example, anti-virus software 116 may be manually initiated by the user, or may have a frequency for performing scans (e.g., every 4 hours) that is less than the frequency of backups (e.g., every 2 hours). Following the latter example, if anti-virus software 116 completes a scan of backup 1 at t1 and completes its subsequent scan of backup 3 at t3 (without scanning backup 2), anti-virus software 116 may determine that backup 1 is malware-free and backup 3 has been compromised by a malware attack.

In some aspects, in response to determining that backup 1 is malware-free and backup 3 has been compromised, backup and restore agent 120 may attempt to narrow the attack time window of between t1 and t3. Backup and restore agent 120 may instruct anti-virus software 116 to perform scans of all backups between backup 1 and backup 3. Based on the scan results, backup and restore agent 120 may determine that the most recent backup that is malware-free is backup 2 (indicating that the attack occurred between t2 and t3—thus narrowing the attack time window). Backup and restore agent 120 may then restore backup 2 and restore subsequent user data changes between t2 and t3.

In some aspects, in response to determining that backup 1 is malware-free and backup 3 has been compromised, backup and restore agent 120 may proceed to restore backup 1, data changes between t1 and t2, and data changes between t2 and t3. In these aspects, the processing power required to scan backups between backup 1 and backup 3 is conserved. However, in addition to determining the data changes between t2 and t3 (when the attack occurred), backup and restore agent 120 also needs to determine the data changes between t1 and t2, which also may utilize considerable processing power.

Backup and restore agent 120 may thus assess which of the aspects will conserve the highest amount of processing and select that aspect (e.g., scanning multiple backups or determining multiple data changes. For example, anti-virus software 116 may only be manually initiated by a user. The user may request a scan of backup 1, but may not request the next scan until backup N. At backup N, anti-virus software 116 may detect the malware attack and may not immediately know the most recent malware-free scan other than backup 1. Depending on the number of backups that have occurred between backup 1 and backup N, backup and restore agent 120 may work backwards from backup N and scan each preceding backup to determine the most recent malware-free backup. Alternatively, backup and restore agent 120 may restore backup 1 and all data changes between t1 and tN.

In some aspects, if anti-virus software 116 attempts to narrow the attack time window, anti-virus software 116 may determine a path of a corrupted file affected by the malware attack at backup N and solely scan the corrupted file in preceding backups (instead of performing full scans). Using this method, backup and restore agent 120 may determine that backup 2 is the most recent malware-free backup in a more efficient manner.

In some aspects, anti-virus software 116 attempts to narrow the attack time window by identifying a residual file of the malware attack and identifying the creation time of the residual file. For example, the creation time may be listed in the metadata of the residual file. Suppose that the creation time is between t2 and t3. Backup and restore agent 120 may determine that backup 2, which is the most recent backup preceding the creation time, is a malware-free backup.

In exemplary aspects, tracked files that are changed are tracked even if they are saved in any previous backup.

Figure 2:
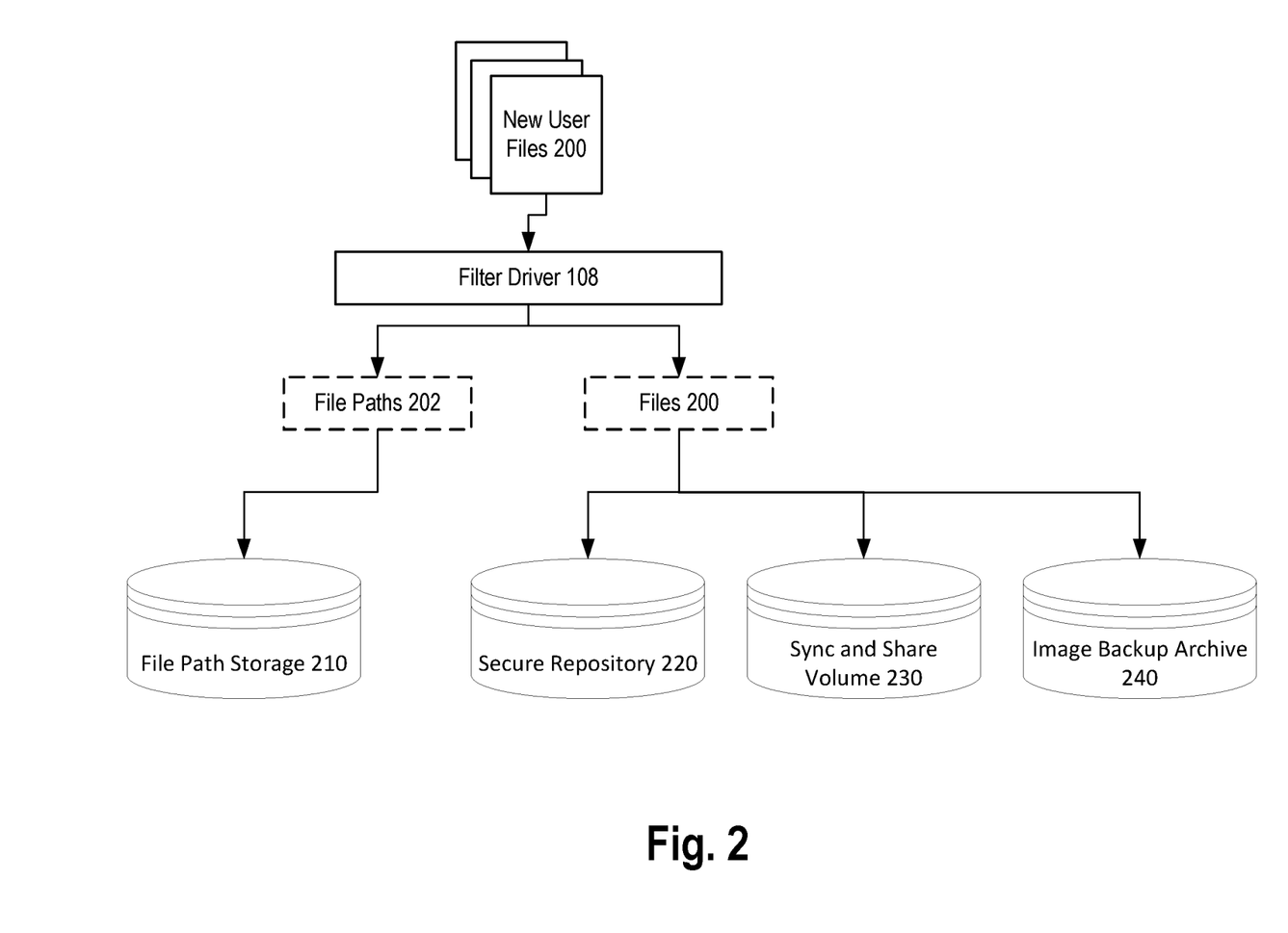
FIG. 2 is a block diagram further illustrating the filter driver, in accordance with exemplary aspects of the present disclosure.

FIG. 2 is a block diagram further illustrating the filter driver 108, in accordance with exemplary aspects of the present disclosure.

After a backup has been performed, the filter driver 108 intercepts all new user files 200 (or modified user files, applications or the like). The File paths 202 associated with the new user files 200 are stored in file path storage 210 and the data of the files 200 are stored in a location specified by a user or administrator. Once a restore is completed, these files are scanned for maliciousness and are copied from the location, back to the specified path. Additionally, in another aspect, the filter driver 108 may store the data of files 200 in a secure repository 220 along with the path information 202. This may be a protected area on a local drive, in cloud storage, or the like. Furthermore, in another exemplary aspect, the files 200 may already be stored in a Sync and Share volume 230, which is a file archiving system. In this aspect, changes and additions are automatically recognized and detected, and the changes or additions are synchronized with a central archive or another device. In exemplary aspects, in sync and share volumes, reparse points are used on volumes for files that are actively tracked between backup operations. The reparse points point to the latest version of a tracked file in a Sync and Share volume. In general, reparse points allow a restore operation to be performed, the reparse points to be added with the necessary metadata to locate actual file contents in a Sync and Share volume and to recall the file data on demand. In some aspects, the filter driver 108 may store, for quick retrieval, the data of files 200 in a special dedicated portion of image backup archive that is used for regular backup operations.

Figure 3:
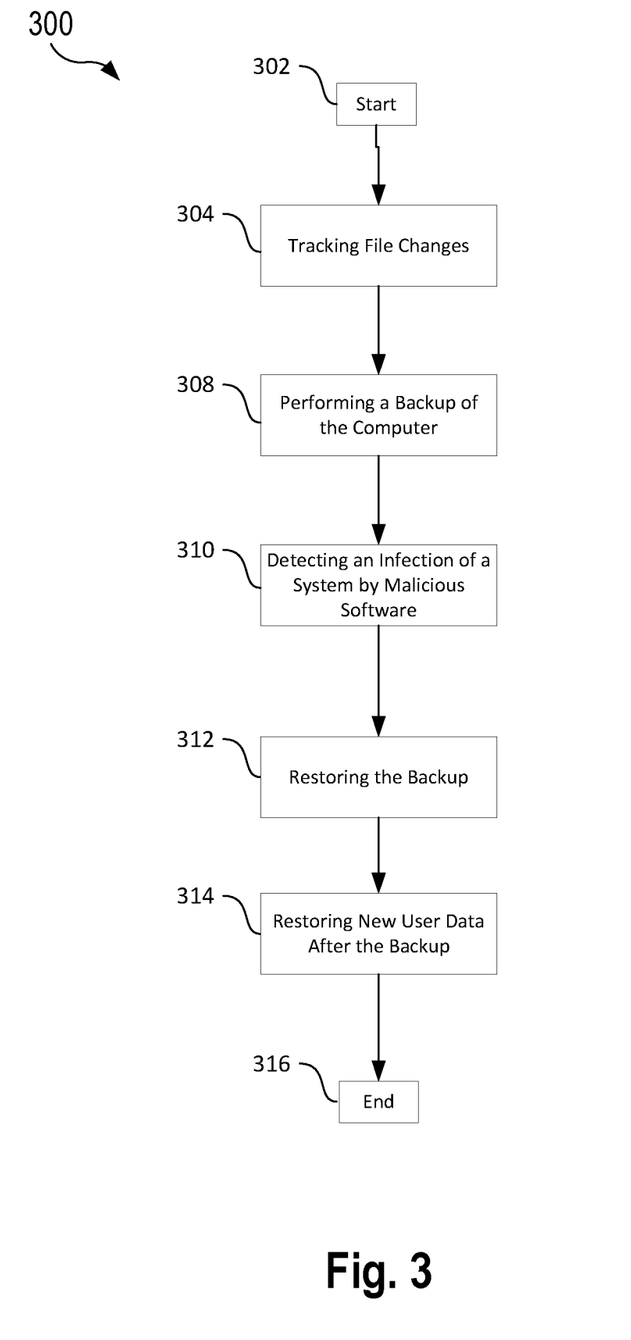
FIG. 3 is a flowchart illustrating a method for remediation of data without loss, in accordance with exemplary aspects of the present disclosure.

FIG. 3 is a flowchart illustrating a method 300 for remediation of data without loss, in accordance with exemplary aspects of the present disclosure.

The method begins at 302 and proceeds to 304. At 304, a driver, e.g., filter driver 108 of FIG. 1, tracks changes of files on the computer system, e.g., computer 101. In exemplary aspects, the filter driver 108 is a kernel-level driver that resides in a layer above the file system to intercept changes to files stored in a storage device.

At 308, the filter driver 108 requests backup software to perform a backup of the files on the file system. In some embodiments, the backup is performed without such a request, on a periodic basis by backup and restore module, e.g., agent 120 in FIG. 1A.

At 310, the filter interceptor is informed that an infection is detected of the computer system by a malicious application. In some aspects, anti-virus software such as software 116 informs the filter driver 108 that malware or ransomware is detected.

Accordingly, at 312, the filter driver 108 requests that the backup and restoration module restore the most previously performed backup (e.g., backup 2 in FIG. 1B) of the files to the storage device.

In some aspects, users may have made changes to files or added new files after the backup had been performed. Thus, if restoration were to only include the previously performed backup, the new files or modifications would be lost. Therefore, at 314, the filter driver 108 requests that the backup and restoration module restore the new or modified user data occurring temporally after the backup of the files on the file system.

The method 300 terminates at 316.

Figure 4:
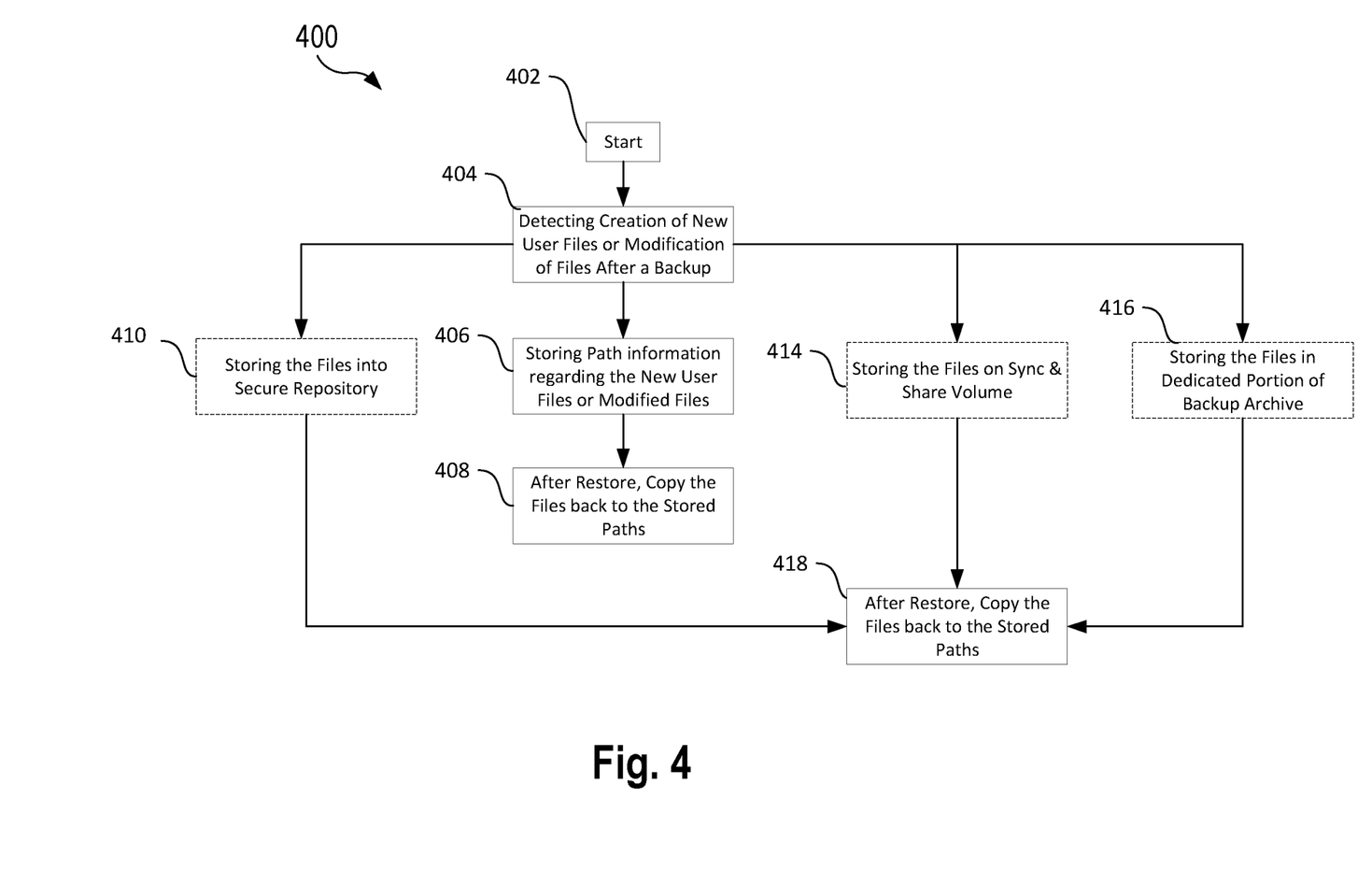
FIG. 4 is a flowchart illustrating another method for remediation of data without loss, in accordance with exemplary aspects of the present disclosure.

FIG. 4 is a flowchart illustrating another method 400 for remediation of data without loss, in accordance with exemplary aspects of the present disclosure.

The method begins at 402 and proceeds to 404.

At 404, the filter interceptor detects that new user files were created or existing user files were modified, after the backup of the files on the file system.

At 406, the filter interceptor stores path information related to the new user files to secure storage. Storing only the path information meets the goal of system 100 in simply adding the latest copies of tracked files that are not in the restored backup. The actual files can be stored elsewhere prior to system restoration, and later be moved back to their location based on the securely stored file paths. In another aspect, the filter interceptor stores the path information and the content of the modified/new user files to secure storage.

At 408, after restoring the backup, the filter interceptor retrieves the path information of the new user files and modified user files and restores the new user data based on the retrieved path information.

As an additional aspect, the method 400 may proceed to 410 from 404, where the files that were added or modified are themselves stored into a secure repository.

In some aspects, the method proceeds to 414 from 404, where the filter interceptor may store the path information and the new user files and the modified user files in a sync and share storage volume in order to track file changes.

In some aspects, the method proceeds to 416 from 404, where the filter interceptor may store the files in a dedicated portion of a backup archive.

The method terminates at 418, which is connected to 410, 414, and 416. At 418, after the restore, the filter interceptor copies the files back to the stored paths.

Figure 5:
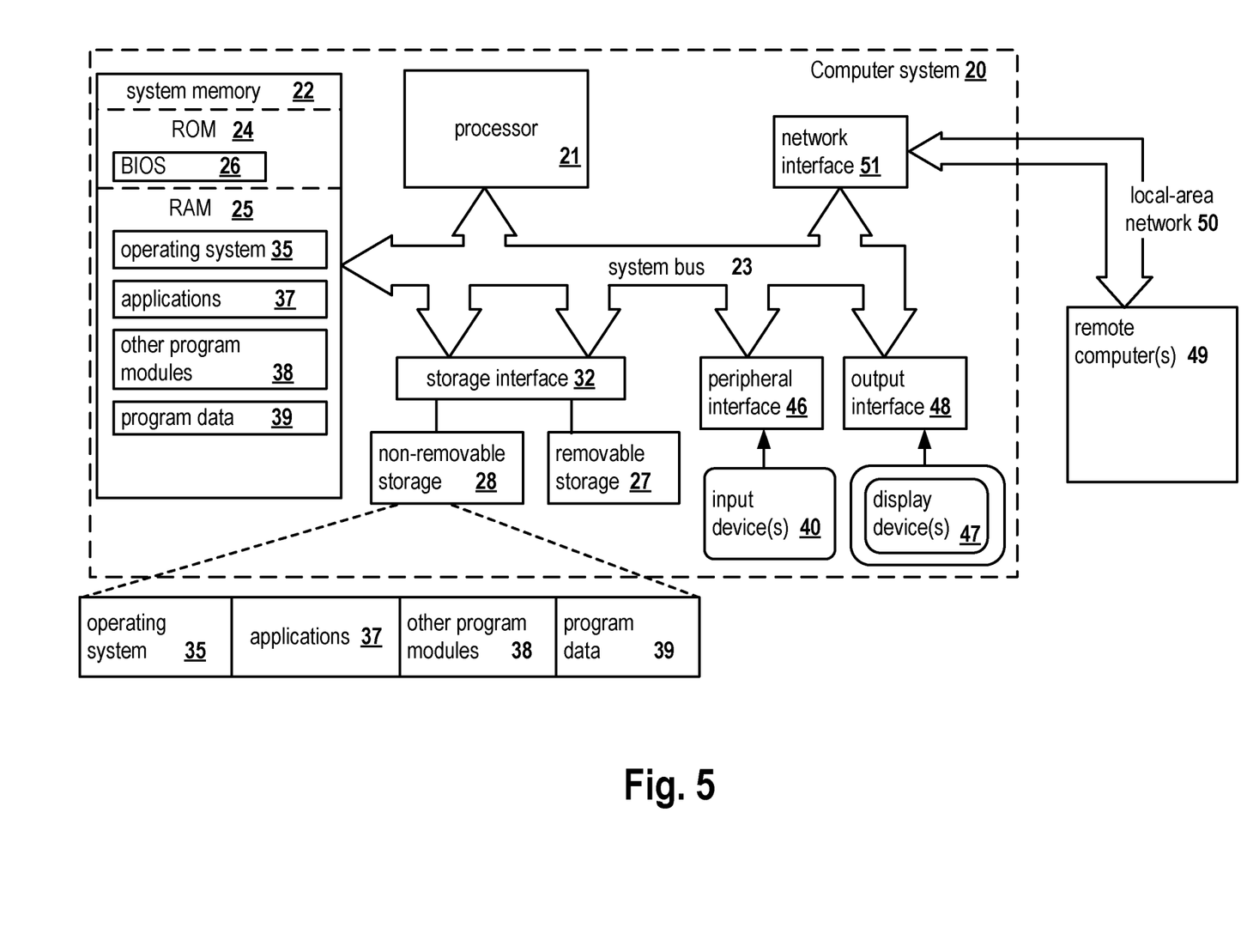
FIG. 5 is a block diagram of a computer system on which the disclosed system and method can be implemented according to an exemplary aspect.

FIG. 5 is a block diagram illustrating a computer system 20 on which aspects of systems and methods for data remediation without data loss may be implemented in accordance with an exemplary aspect. It should be noted that the computer system 20 can correspond to the computer 101 for example, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for remediation of data, the method comprising:
 performing, at a first time by a processor, a first backup of a plurality of files on a file system of a computer system;
 tracking, by the processor, changes to any of the plurality of files on the file system after the first time by determining whether new user files were created or existing user files were modified on the file system;
 storing path information, the new user files, and modified user files in a sync and share storage volume;
 maintaining reparse points and metadata for the new user files and the modified user files, wherein the metadata identifies a location of the new user files and the modified user files in the sync and share storage volume;
 performing, at a second time by the processor, a second backup of the plurality of files on the file system;
 detecting, by the processor, based on a scan of the second backup, an infection of the computer system caused by a malicious application;
 identifying, by the processor, a most recent backup of the file system that does not comprise the infection;
 in response to determining that the first backup is the most recent backup:
  restoring, by the processor, the first backup to the file system;
  restoring, by the processor, a subset of files on the file system for which authorized changes were detected between the first time and the second time by recalling data of the new user files and modified user files from the sync and share storage volume using the reparse points.

2. The method of claim 1, wherein the authorized changes comprises at least one of (1) file modification, (2) file removal, (3) file creation, wherein the authorized changes are not caused by the malicious application and are verified by a user of the computer system.

3. The method of claim 1, wherein a third backup is performed by the processor at a third time between the first time and the second time, wherein the infection was caused between the first time and the third time, and wherein the infection was detected by the processor after the second time, further comprising:
  performing a scan of the third backup; and
  in response to determining that the infection exists in the third backup, restoring the first backup and restoring the subset of files.

4. The method of claim 1, wherein a third backup is performed by the processor at a third time between the first time and the second time, wherein the infection was caused between the third time and the second time, and wherein the infection was detected by the processor after the second time, further comprising:
  performing a scan of the third backup; and
  in response to determining that the infection does exist in the third backup, restoring the third backup and restoring another subset of files on the file system for which authorized changes were detected between the third time and the second time.

5. The method of claim 1, wherein tracking the changes to any of the plurality of files further comprises:
  storing the path information related to the new user files or the modified user files to secure storage.

6. The method of claim 5, wherein restoring the subset of files comprises:
  after restoring the first backup, retrieving the path information of the new user files and the modified user files; and
  restoring the subset of files based on the retrieved path information.

7. The method of claim 1, further comprising:
  storing the new user files and the modified user files to secure storage along with the path information;
  performing a scan for maliciousness on the new user files and the modified user files; and
  wherein restoring the subset of files comprises restoring the new user files and the modified user files from the secure storage to the file system of the computer system based on the scan.

8. The method of claim 1, further comprising:
  identifying a dedicated portion of an image backup archive used for regular backup operations; and
  storing the path information, the new user files and the modified user files in the dedicated portion of the image backup archive.

9. A system for remediation of data, the system comprising:
  a processor configured to:
    perform, at a first time, a first backup of a plurality of files on a file system of a computer system;
    track changes to any of the plurality of files on the file system after the first time by determining whether new user files were created or existing user files were modified on the file system;
    store path information, the new user files, and modified user files in a sync and share storage volume;
    maintain reparse points and metadata for the new user files and the modified user files, wherein the metadata identifies a location of the new user files and the modified user files in the sync and share storage volume;
    perform, at a second time, a second backup of the plurality of files on the file system;
    detect, based on a scan of the second backup, an infection of the computer system caused by a malicious application;
    identify a most recent backup of the file system that does not comprise the infection;
    in response to determining that the first backup is the most recent backup:
      restore the first backup to the file system;
      restore a subset of files on the file system for which authorized changes were detected between the first time and the second time by recalling data of the new user files and modified user files from the sync and share storage volume using the reparse points.

10. The system of claim 9, wherein the authorized changes comprises at least one of (1) file modification, (2) file removal, (3) file creation, wherein the authorized changes are not caused by the malicious application and are verified by a user of the computer system.

11. The system of claim 9, wherein a third backup is performed by the processor at a third time between the first time and the second time, wherein the infection was caused between the first time and the third time, wherein the infection was detected by the processor after the second time, and wherein the processor is further configured to:
  perform a scan of the third backup; and
  in response to determining that the infection exists in the third backup, restore the first backup and restore the subset of files.

12. The system of claim 9, wherein a third backup is performed by the processor at a third time between the first time and the second time, wherein the infection was caused between the third time and the second time, wherein the infection was detected by the processor after the second time, and wherein the processor is further configured to:
  perform a scan of the third backup; and
  in response to determining that the infection does exist in the third backup, restore the third backup and restore another subset of files on the file system for which authorized changes were detected between the third time and the second time.

13. The system of claim 9, wherein the processor is further configured to track the changes to any of the plurality of files by:
  storing the path information related to the new user files or the modified user files to secure storage.

14. The system of claim 13, wherein the processor is further configured to restore the subset of files by:
  after restoring the first backup, retrieving the path information of the new user files and the modified user files; and
  restoring the subset of files based on the retrieved path information.

15. The system of claim 9, wherein the processor is further configured to:
  store the new user files and the modified user files to secure storage along with the path information;
  perform a scan for maliciousness on the new user files and the modified user files; and
  restore the new user files and the modified user files from the secure storage to the file system of the computer system based on the scan.

16. The system of claim 1, wherein the processor is further configured to:
  identify a dedicated portion of an image backup archive used for regular backup operations; and
  store the path information, the new user files and the modified user files in the dedicated portion of the image backup archive.

17. A non-transitory computer readable medium storing thereon computer executable instructions for remediation of data, comprising instructions for:
- performing, at a first time, a first backup of a plurality of files on a file system of a computer system;
- tracking changes to any of the plurality of files on the file system after the first time by determining whether new user files were created or existing user files were modified on the file system;
- storing path information, the new user files, and modified user files in a sync and share storage volume;
- maintaining reparse points and metadata for the new user files and the modified user files, wherein the metadata identifies a location of the new user files and the modified user files in the sync and share storage volume;
- performing, at a second time, a second backup of the plurality of files on the file system;
- detecting, based on a scan of the second backup, an infection of the computer system caused by a malicious application;
- identifying a most recent backup of the file system that does not comprise the infection;
- in response to determining that the first backup is the most recent backup:
  - restoring the first backup to the file system;
  - restoring a subset of files on the file system for which authorized changes were detected between the first time and the second time by recalling data of the new user files and modified user files from the sync and share storage volume using the reparse points.

18. The non-transitory computer readable medium of claim 17, wherein a third backup is performed by the processor at a third time between the first time and the second time, wherein the infection was caused between the third time and the second time, and wherein the infection was detected by the processor after the second time, further comprising instructions for:
- performing a scan of the third backup; and
- in response to determining that the infection does exist in the third backup, restoring the third backup and restoring another subset of files on the file system for which authorized changes were detected between the third time and the second time.

* * * * *